(12) United States Patent
Ismagilov et al.

(10) Patent No.: US 6,843,262 B2
(45) Date of Patent: Jan. 18, 2005

(54) FLUIDIC SWITCHES AND METHODS FOR CONTROLLING FLOW IN FLUIDIC SYSTEMS

(75) Inventors: Rustem F. Ismagilov, Chicago, IL (US); Paul J. A. Kenis, Champaign, IL (US); George M. Whitesides, Newton, MA (US); David Rosmarin, Roslyn Heights, NY (US)

(73) Assignee: President and Fellows of Harvard College, Cambridge, MA (US)

( * ) Notice: Subject to any disclaimer, the term of this patent is extended or adjusted under 35 U.S.C. 154(b) by 95 days.

(21) Appl. No.: 10/131,610

(22) Filed: Apr. 24, 2002

(65) Prior Publication Data

US 2003/0015244 A1 Jan. 23, 2003

Related U.S. Application Data

(60) Provisional application No. 60/286,476, filed on Apr. 25, 2001.

(51) Int. Cl.[7] .............................................. F17D 1/16
(52) U.S. Cl. ......................... 137/14; 137/137; 137/822; 137/827; 137/833
(58) Field of Search ................................ 137/833, 822, 137/827, 14; 251/11

(56) References Cited

U.S. PATENT DOCUMENTS

| | | | |
|---|---|---|---|
| 2,522,249 A | | 9/1950 | Baker |
| 3,442,279 A | * | 5/1969 | Swartz ........................ 137/836 |
| 3,592,208 A | * | 7/1971 | Kimmel et al. .............. 137/822 |
| 4,360,039 A | | 11/1982 | Jeppsson |
| 4,439,526 A | * | 3/1984 | Columbus ................... 436/180 |
| 4,506,703 A | | 3/1985 | Baron |
| 4,908,112 A | * | 3/1990 | Pace ........................ 210/198.2 |
| 5,296,114 A | * | 3/1994 | Manz ........................ 204/451 |
| 5,928,880 A | | 7/1999 | Wilding et al. |
| 5,948,684 A | | 9/1999 | Weigl et al. |
| 5,955,029 A | | 9/1999 | Wilding et al. |
| 6,046,056 A | * | 4/2000 | Parce et al. ............. 204/403.05 |
| 6,062,261 A | * | 5/2000 | Jacobson et al. ........... 137/827 |
| 6,129,331 A | * | 10/2000 | Henning et al. ............... 251/11 |
| 6,130,098 A | * | 10/2000 | Handique et al. ........... 436/180 |
| 6,136,272 A | | 10/2000 | Weigl et al. |
| 6,167,910 B1 | | 1/2001 | Chow |
| 6,184,029 B1 | | 2/2001 | Wilding et al. |
| 6,296,020 B1 | * | 10/2001 | McNeely et al. ........... 137/806 |
| 6,321,791 B1 | | 11/2001 | Chow |
| 6,334,301 B1 | | 1/2002 | Otsap et al. |
| 6,355,198 B1 | | 3/2002 | Kim et al. |
| 6,375,901 B1 | | 4/2002 | Robotti et al. |
| 6,482,306 B1 | * | 11/2002 | Yager et al. ................. 204/600 |
| 2002/0113095 A1 | | 8/2002 | Jeon et al. |
| 2002/0168278 A1 | | 11/2002 | Jeon et al. |

FOREIGN PATENT DOCUMENTS

| | | |
|---|---|---|
| DE | 199 29 734 A1 | 12/1999 |
| WO | WO 99/09042 A2 | 2/1999 |
| WO | WO 01/25138 A1 | 4/2001 |
| WO | WO 01/89787 A2 | 11/2001 |
| WO | WO 02/22264 A2 | 3/2002 |

* cited by examiner

Primary Examiner—A. Michael Chambers
(74) Attorney, Agent, or Firm—Wolf, Greenfield & Sacks, P.C.

(57) ABSTRACT

The present invention relates to fluidic systems, including switches for fluidic systems. The switches of the present invention may be particularly applicable to microfluidic systems. The switches of the invention may include a switching region having more than one position corresponding to more than one aspect ratio. Alternatively, the switches of the invention may include multiple inlets and a system for the selective supply of carrier fluid. The present invention also relates to a method of controlling a fluid in a microfluidic system and may be performed using the switches of the present invention.

31 Claims, 6 Drawing Sheets

FLUIDIC SWITCHES AND METHODS FOR CONTROLLING FLOW IN FLUIDIC SYSTEMS

RELATED APPLICATIONS

This patent application claims priority to U.S. Provisional Patent Application No. 60/286,476, filed Apr. 25, 2001. +gi

GOVERNMENT FUNDING

This invention was sponsored by the National Science Foundation Grant Number ECS9729405. The government has certain rights in the invention.

FIELD OF THE INVENTION

The present invention relates to fluidic systems and, in particular, switches for fluidic systems and methods for using them to control the flow in fluidic systems.

BACKGROUND OF THE INVENTION

Microfluidic systems are flow systems miniaturized to dimensions typically as small as a few micrometers ($\mu$m). Such systems present challenges in both their design and manufacture. For example, at the level of miniaturization of typical microfluidic systems, fluid flow is predominantly laminar. Laminar flow may also be found in other fluidic systems, such as those including viscous fluids or having low flow rates. Accordingly, the challenges presented by working in laminar flow regimes are not limited to microfluidic systems.

Fluid flow conditions in microfluidic systems and otherwise are typically represented by a dimensionless number known as the Reynolds Number (Re). The Reynolds number is defined as the ratio of inertial forces to viscous forces within a fluid. A low Re (e.g., <100) is associated with laminar flow, while a high Re (e.g., >2000) is associated with turbulent flow. For example, turbulent flow typically develops at Re>2000 in a circular pipe. Fluid flow in microfluidic systems is typically characterized by very low Re (e.g., <10), representing stable, laminar flow. Flow lines of laminar flow—as opposed to turbulent flow—do not diverge in simple geometries, and several streams in a capillary may flow in parallel, mixing only by diffusion.

Recent developments in microfluidic systems have been motivated in large part by the possibility of fabricating compact, integrated devices for analytical functions such as genomic analysis, diagnosis and sensing.

SUMMARY OF THE INVENTION

According to one embodiment of the present invention, a microfluidic system is provided including a first fluid path having a first inlet, a second fluid path in fluid contact with the first fluid path at a fluid contact point and a switch for selectively controlling the passage of fluid between the first fluid path and the second fluid path at the fluid contact point. In this embodiment, at least one of the first fluid path and the second fluid path has a cross-sectional dimension of less than about 500 $\mu$m.

According to another embodiment of the present invention, a fluidic system is provided including a first fluid path having a first inlet, a second fluid path in fluid contact with the first fluid path at a fluid contact point and a switch for selectively controlling the passage of fluid between the first fluid path and the second fluid path at the fluid contact point. This embodiment is constructed and arranged to allow a fluid flowing in at least one of the first fluid path and the second fluid path to flow under laminar flow conditions. Optionally, the fluid may be characterized by having a Reynolds number of less than or equal to about 10.

According to another embodiment of the present invention, a method of controlling fluid flow in a fluidic system is provided that includes providing a fluidic system. The fluidic system includes a first fluid path having a first inlet and a second fluid path in fluid contact with the first fluid path at a fluid contact point. The method also includes flowing a fluid through the first fluid path. The method further includes changing an aspect ratio of the first fluid path at the fluid contact point to switch at least a portion of the fluid from the first fluid path to the second fluid path at the fluid contact point.

According to another embodiment of the present invention, a method of controlling fluid flow in a fluidic system is provided including providing a fluidic system. The fluidic system includes a first fluid path having a first inlet, a second inlet and a third inlet, and a second fluid path in fluid contact with the first fluid path at a fluid contact point. The method also includes supplying a process fluid to the first inlet of the first fluid path, and supplying a carrier fluid to the second inlet of the first fluid path such that the carrier fluid forces the process fluid into a first portion of the first flow path, inhibiting switching of the process fluid to the second fluid path at the fluid contact point. The method further includes ceasing supplying the carrier fluid to the second fluid path, and supplying the carrier fluid to the third inlet of the first fluid path such that the carrier fluid forces the process fluid into a second portion of the first flow path, facilitating switching of the process fluid to the second fluid path at the fluid contact point.

According to another embodiment of the present invention, a method is provided that includes allowing a first fluid to flow along a first fluid path and allowing a second fluid to flow along a second fluid path tangentially intersecting the first fluid path. The first and second fluid paths are essentially free of the second and first fluids, respectively. The method also includes manipulating a valve associated with either fluid path, diverting the first fluid into the second path.

Other advantages, novel features, and objects of the invention will become apparent from the following detailed description of the invention when considered in conjunction with the accompanying drawings, some of which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

FIG. 2 (sections a and b) are (section a) a perspective, plan view of a microfluidic system according to another embodiment of the present invention, and (section b) a perspective, plan view of the microfluidic system of section a in a second position;

FIG. 7b is a photocopy of a photomicrograph of the microfluidic system of FIG. 7a;

FIG. 8b is a photocopy of a photomicrograph of the microfluidic system of FIG. 8a;

FIG. 9b is a photocopy of a photomicrograph of the microfluidic system of FIG. 9a;

DETAILED DESCRIPTION

The present invention is directed to a fluidic system. "Fluidic system," as used herein, refers to a device, apparatus or system including at least one fluid path. In many embodiments of the invention, the fluidic system is a microfluidic system. "Microfluidic system," as used herein, refers to a device, apparatus or system including at least one fluid path having a cross-sectional dimension of less than 1 millimeter (mm). "Fluid path," as used herein, refers to any channel, tube, pipe or pathway through which a fluid, such as a liquid or a gas, may pass. "Enclosed fluid path," as used herein, refers to any fluid path that is substantially contained except at inlets, outlets, fluid contact points, and the like. "Cross-sectional dimension," as used herein, refers to the shortest distance that may be measured between any two opposed surfaces of a fluid path. However, in certain preferred embodiments, the longest distance that may be measured between any two opposed surfaces of a fluid path is also less than the maximum cross-sectional dimension for that embodiment. "Aspect ratio" or "A," as used herein, refers to the ratio of the height to width of a fluid path. The height and width of a typical fluid path configuration are marked with "h" and "w," respectively, in FIG. 1. "Crossing angle," as used herein, refers to the angle between two intersecting fluid paths measured between the inlets of those fluid paths. "Inlet," as used herein, refers to a portion of a fluid path upstream of a fluid contact point between two fluid paths. Accordingly, a crossing angle of 180° indicates the fluid paths overlap completely, but are flowing in opposite directions, while a crossing angle of 0° indicates that the fluid paths overlap completely and are flowing in the same direction.

The inventors have discovered that, in fluidic systems wherein the flow conditions are laminar, such as is typical in microfluidic systems, whether fluid is exchanged between tangentially intersecting fluid paths depends on the aspect ratios of the fluid paths, the position of the fluids in the fluid paths, the Reynolds number (Re) of the fluids and the crossing angle of the fluid paths. By describing the fluid paths as "tangentially intersecting," it is meant that one of the fluid paths passes over the other such that the fluid paths are in fluid contact where the fluid paths cross. It should be understood that while the fluid paths are described as being tangentially intersecting, some degree of overlap may exist between them. With respect to the aspect ratio, it has been demonstrated that higher aspect ratios inhibit fluid exchange, while lower aspect ratios favor it. Regarding the position of the fluids, it has been found that fluid in the side of a fluid path closest to the inlet of a tangentially intersecting fluid path is less likely to be exchanged than fluid in the side further away from the inlet of the intersecting flow path. Regarding the Reynolds number and crossing angle, it has been demonstrated that lower Reynolds numbers and higher crossing angles facilitate fluid exchange.

The inventors have also discovered that manipulation of the aspect ratios of the fluid paths, the position of the fluids in the fluid paths, the Reynolds number (Re) of the fluids and the crossing angle of the fluid paths may be used to control whether fluid is exchanged between fluid paths. Accordingly, manipulating these properties in real time allows creation of real time fluid and microfluidic switches. Manipulation of the aspect ratio of the fluid paths and the position of the fluids within the fluid paths are particularly effective ways of creating such switches.

Figure 7A:
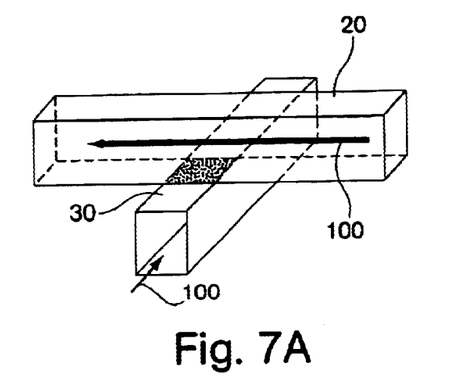
FIG. 7a is a perspective, plan view of a microfluidic system according to another embodiment of the present invention.
Figure 7B:
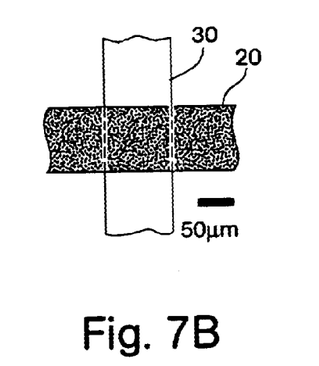
Figure 8A:
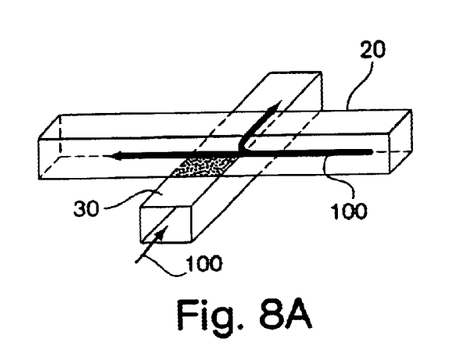
FIG. 8a is a perspective, plan view of a microfluidic system according to another embodiment of the present invention.
Figure 8B:
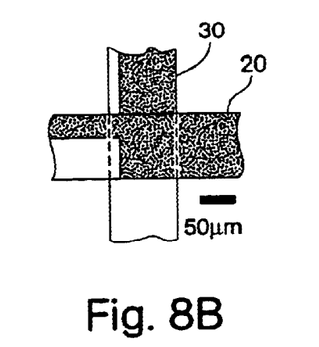
Figure 9A:
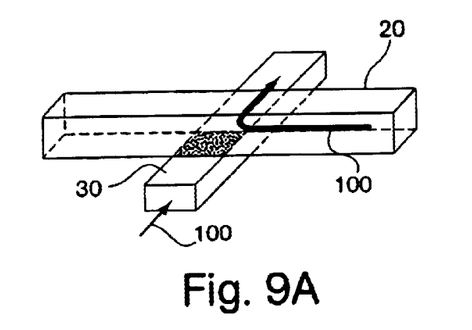
FIG. 9a is a perspective, plan view of a microfluidic system according to another embodiment of the present invention.
Figure 9B:
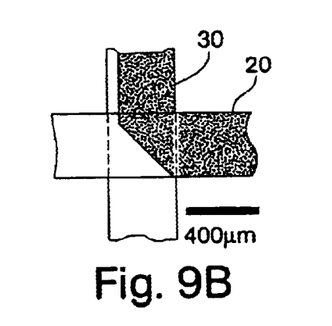

FIGS. 7a–9b illustrate the effect of aspect ratio on whether fluid is exchanged between fluid paths. In FIGS. 7a and 7b, the aspect ratio of fluid paths 20, 30 is relatively high (100 μm×160 μm, A=1.6) and the majority of fluid in a fluid path 20 is not exchanged with fluid path 30. In FIGS. 8a and 8b, the aspect ratio of the fluid paths is intermediate (100 μm×44 μm, A=0.44) and some of the fluid in fluid path 20 is exchanged. In FIGS. 9a and 9b, the aspect ratio of the fluid paths is relatively low (400 μm×23 μm, A=0.058) and the majority of fluid in fluid path 20 is exchanged.

Figure 10A:
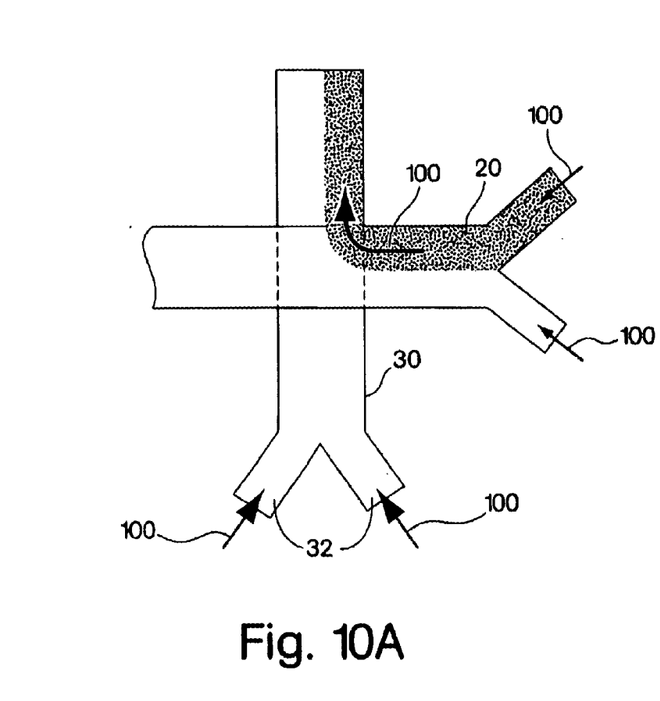
FIG. 10a is a top, plan view of a microfluidic system according to another aspect of the present invention.
Figure 10B:
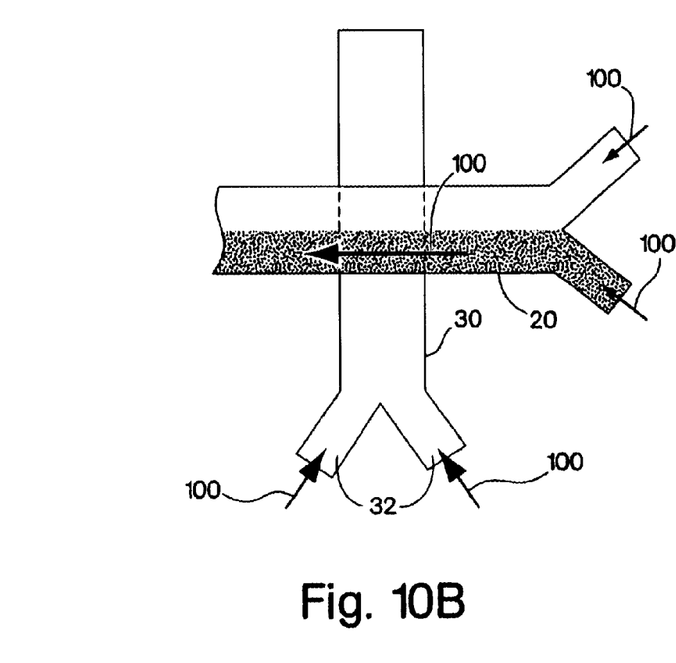
FIG. 10b is a top, plan view of the microfluidic system of FIG. 10a under alternate flow conditions.

FIGS. 10a and 10b illustrate the effect of position within a fluid path on whether fluid is exchanged between fluid paths. In both figures, the aspect ratio is assumed to be intermediate (approximately 0.44). In FIG. 10a, the fluid of interest (marked by crosshatching) is in the side of fluid path 20 furthest from inlet 32 of a second fluid path 30 and is exchanged with second fluid path 30. In FIG. 10b, the fluid of interest is in the side of fluid path 20 closest to inlet 32 of fluid path 30 and is not exchanged.

While manipulation of the Reynolds number of the fluids and the crossing angle of the fluid paths may also be used to create a switch, and are within the scope of the present invention, in the following description of preferred embodiments, Reynolds numbers will be assumed to be low enough not to have a significant impact on switching and the crossing angle will be assumed to be about 90°.

In one embodiment, the fluidic system of the present invention, which may be a microfluidic system, includes a first fluid path having a first inlet, a second fluid path in fluid contact with the first fluid path at a fluid contact point and a switch for selectively controlling the passage of fluid between the first fluid path and the second fluid path at the fluid contact point.

Figure 1:
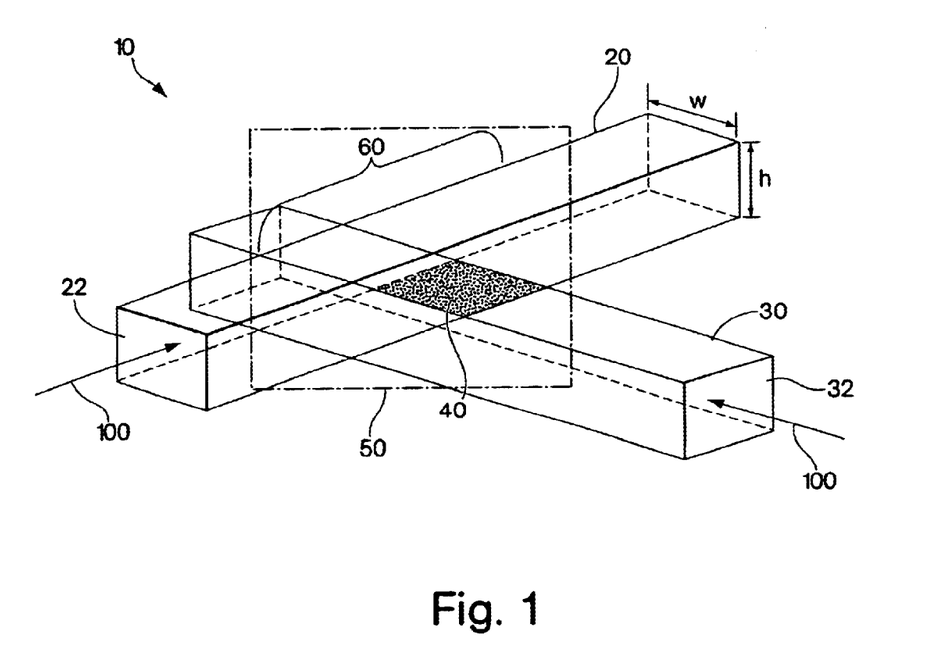
FIG. 1 is perspective, plan view of a microfluidic system according to one embodiment of the present invention.

Referring now to FIG. 1, an embodiment of a microfluidic system configured as a switch will be described. This embodiment of a microfluidic system 10 may include a first fluid path 20 having a first inlet 22, a second fluid path 30 in fluid contact with first fluid path 20 at a fluid contact point 40 (emphasized with shading) and a switch 50 for selectively controlling the passage of fluid between first fluid path 20 and second fluid path 30 at fluid contact point 40.

Typically, in operation of the embodiment of microfluidic system 10 illustrated in FIG. 1, a first fluid is introduced, for example by pumping, into first fluid path 20 through first inlet 22 and a second fluid is similarly introduced into second fluid path 30 through an inlet 32. Following introduction, the first and second fluids flow through their respective fluid paths 20, 30 as illustrated by flow indicators 100, passing one another at fluid contact point 40 with essentially no mixing. However, switch 50 may be actuated to modify a property of microfluidic system 10, such as the aspect ratio of fluid paths 20, 30 or the location of the fluids in fluid paths 20, 30, causing fluid to be exchanged between fluid paths 20, 30. Preferably, in a first, non-switched position, less than 10% of each fluid is diverted from the original fluid path (e.g., 20) into the other fluid path (e.g., 30) via mixing or switching as described below; more preferably, less than 5% of each fluid is diverted from the original fluid path into the other fluid path; still more preferably, less than 2% of each fluid is diverted from the original fluid path into the other fluid path; yet still more preferably, less than 1% of each fluid is diverted from the original fluid path into the other fluid path; most preferably, essentially no fluid is diverted from the original fluid path into the other fluid path. The action of switch 50 may be better understood with reference to the construction of microfluidic system 10.

Fluid paths 20, 30 may be constructed in any manner and of any material(s) that allow a fluid to flow through fluid paths 20, 30 without adversely affecting or being affected by the fluid. For example, fluid paths 20, 30 may have any configuration or cross-sectional dimension that allows passage of a fluid or fluids to be used with microfluidic system 10 at an acceptable pressure drop. Preferably, the cross-sectional dimension is as small as possible without inhibiting the flow of the fluid or fluids to be used with microfluidic system 10. For example, fluid paths 20, 30 may have a cross-sectional dimension of less than 1 mm, preferably less than 500 $\mu$m, more preferably less than 300 $\mu$m, still more preferably less than 100 $\mu$m and, most preferably, less that 50 $\mu$m. However, it should be recognized that the preferred cross-sectional dimension of fluid paths 20,30 will vary with the fluid(s) and application. For example, fluids, such as blood, including cells therein, may suffer damage to the cells if the cross-sectional dimension is small. As a further example, fluids having a high viscosity may require excessive pumping pressure if the cross-sectional dimension is small.

The preferred configuration of fluid paths 20, 30 may vary with microfluidic system 10 and the fluid(s) to be used therein. Generally, fluid paths 20, 30 are preferred to be as straight and direct as possible from inlet to outlet to minimize pressure drop and reduce damage to time sensitive or shear sensitive fluids. However, in some instances, fluid paths 20, 30 may be preferred to be longer or more convoluted than otherwise necessary, such as where fluid paths 20,30 serve as reactors or mixers wherein a residue time is desired.

Fluid paths 20, 30 may have any shape cross-section suitable for use with the desired fluid or fluids. For example, the cross-section of fluid paths 20, 30 may be polygonal, ovoid or of odd or irregular shape. Preferably, the cross-section of fluid paths 20, 30 is rectangular in the vicinity of fluid contact point 40 as this may lead to more predictable switching behavior.

Figure 3:
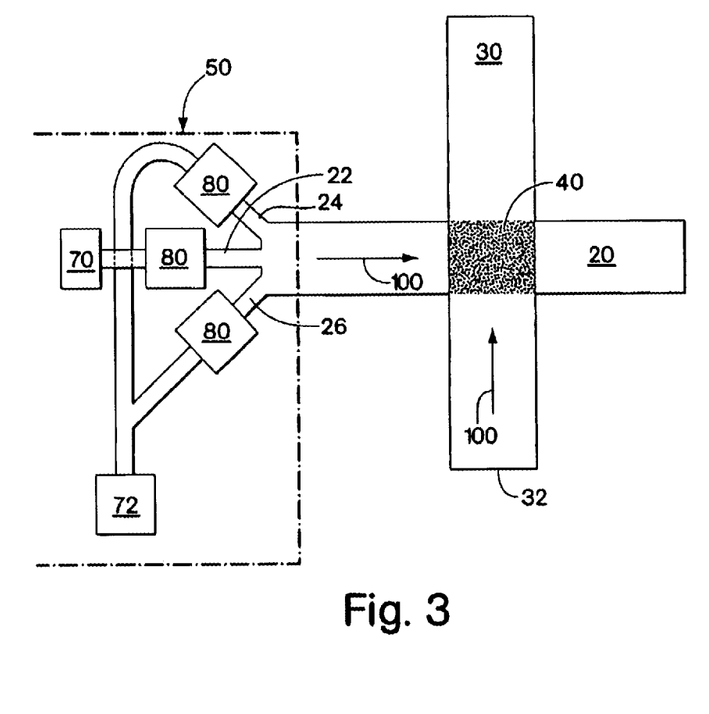
FIG. 3 is a top, plan view of a microfluidic system according to another embodiment of the present invention.

Fluids paths 20, 30 may include inlets 22, 24, 26, 32 (see also FIG. 3). Inlets 22, 24, 26, 32 may be constructed in any manner that allows fluid to be introduced into fluid paths 20, 30. For example, inlets 22, 24, 26, 32 may be injection ports, slits, funnels, other openings or a combination of opening types. Inlets 22, 24, 26, 32 may be adapted to mate with an additional fluid path, pump or other device to facilitate the introduction of fluid into fluid paths 20, 30.

Fluid paths 20, 30 may be constructed of any material(s) that will not adversely affect or be affected by fluid flowing through fluid paths 20, 30. For example, fluid paths 20, 30 may be constructed of a material that is chemically inert in the presence of fluids to be used within fluid paths 20, 30. Preferably, fluid paths 20, 30 are constructed of a single material that is cheap, durable and easy to work with, facilitating use outside a laboratory setting and disposability. For example, fluid paths 20, 30 may be constructed of a polymeric material.

Where fluid paths 20, 30 are constructed of a polymer, the polymer may be selected based on its compatibility with the fluids to be used, its durability and shelf life, its cost and its ease of use. Preferably, fluid paths 20, 30 are constructed from an elastomeric polymer such as polymers of the general classes of silicone polymers, epoxy polymers and acrylic polymers. A particularly preferred polymer is poly (dimethlsiloxane) ("PDMS"). PDMS is a relatively inexpensive, durable, elastomeric polymer. Because PDMS is stable, fluid paths 20, 30 and other portions of microfluidic systems constructed of PDMS may have a shelf life of 6 months or more. PDMS is also relatively easy to work with. It should be understood that while polymeric materials, and particularly PDMS, are preferred for the construction of fluid paths 20, 30, other materials, including conventional silicon chip materials, may be used to construct some or all portions of fluid paths 20, 30.

Microfluidic system 10 according to the present invention may be constructed using any method that will repeatably produce microfluidic system 10 having the desired structure and functionality. For example, microfluidic system 10, or portions of microfluidic system 10, may be constructed by conventional etching techniques known in the art. Preferably, microfluidic system 10 is constructed according to the method described in "Rapid Prototyping of Microfluidic Systems in Poly(dimethylsiloxane)." *Anal. Chem.* 1988, 70, 4974–4984, which is hereby incorporated by reference in its entirety.

Switch 50 may be constructed in any manner and using any material(s) that allow switch 50 to selectively control the exchange of fluid between first fluid path 20 and second fluid path 30. The manner of construction of switch 50 may vary, for example, with the method by which switch 50 effects the selective exchange of fluid between fluid paths 20, 30. Embodiments switching based upon control of the aspect ratio of fluid paths 20, 30 will be described first.

Embodiments where switch 50 selectively switches fluid between fluid paths 20, 30 by varying the aspect ratio of fluid paths 20, 30, such as that illustrated in FIG. 1, may be constructed in any manner and of any material(s) that allow the aspect ratio of one or both fluid paths 20, 30 to be varied. For example, switch 50 may include a switching region 60 of first fluid path 20. For purposes of illustration, it will be assumed that only first fluid path 20 includes switching region 60, though, preferably, both fluid paths 20, 30 include switching region 60. Switching region 60 may be proximate to fluid contact point 40 and may have a first position corresponding to a first aspect ratio of first fluid path 20 and a second position corresponding to a second aspect ratio of first fluid path 20. For example, switching region 60 may include a portion of first fluid path 20 immediately surrounding and opposite fluid contact point 40, a portion smaller than that immediately surrounding and opposite fluid contact point 40, or a portion that extends beyond fluid contact point 40, so long as switching region 60 is of adequate size and location to have a first and second position corresponding to a first and a second aspect ratio of fluid path 20 at fluid contact point 40.

Where switch 50 includes switching region 60 having a first and a second position corresponding to a first and a second aspect ratio of first fluid path 20, one position and corresponding aspect ratio may be selected to inhibit, and the other to promote, the exchange of fluid between the fluid paths 20, 30. For example, the first position and corresponding first aspect ratio may be selected to inhibit the exchange of fluid between fluid paths 20, 30, while the second position and corresponding second aspect ratio may be selected to promote the exchange of fluid between fluid paths 20, 30. As higher aspect ratios inhibit the exchange of fluid between fluid paths 20, 30, while lower aspect ratios promote the exchange of fluid between fluid paths 20, 30, the first aspect ratio may be higher than the second aspect ratio. For example, for some flow conditions and geometries, the first aspect ratio may be greater than 0.5, while the second aspect ratio is less than 0.5. Preferably, the first aspect ratio is high enough (e.g., about 1.6) that very little fluid is exchanged and the second aspect ratio is low enough (e.g., about 0.06) that substantially all the fluid is exchanged.

Switch 50 may be constructed to move switching region 60 between the first position and the second position sufficiently repeatably and rapidly for a given application. For example, where timing is critical, switch 50 is preferably constructed to move switching region 60 between the first position and the second position very quickly. To allow its aspect ratio to be modified, switching region 60 may be constructed to be deformable. For example, switching region 60 may be flexible. In embodiments where switching region 60 is deformable, switching region 60 may be moved between the first position and the second position by applying pressure to switching region 60, deforming first fluid path 20 and thereby changing it from the first position and first aspect ratio to the second position and second aspect ratio.

Where switching region 60 is deformable, it is preferably capable of non-destructive deformation and of resuming the first position, for example, once pressure is no longer applied to switching region 60. Accordingly, switching region 60 may be constructed of a resilient material, such as an elastomer, having a tendency to return to its original shape. In a preferred embodiment, both fluid paths 20, 30 include a switching region constructed of an elastomer and both switching regions may be deformed from a first position into a second position by application of pressure to switching region 60, promoting the exchange of fluid between fluid paths 20, 30.

Figure 2:
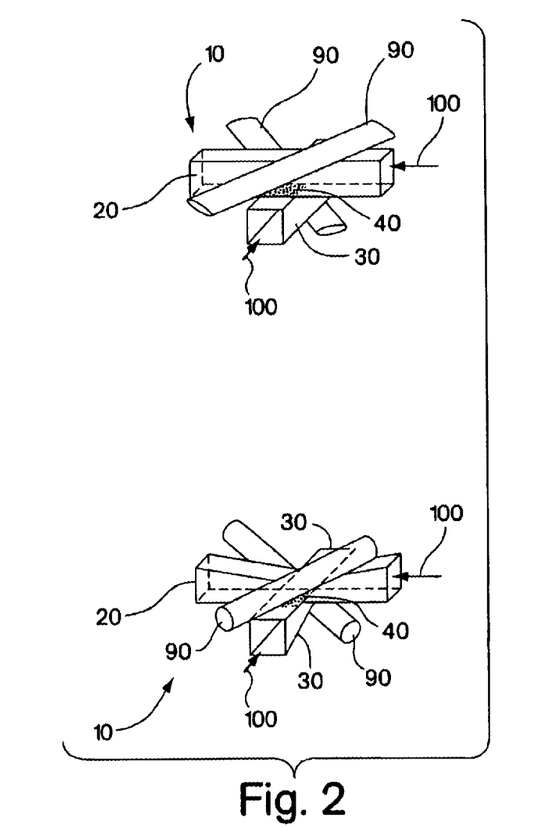

Switch 50 may be actuated in any manner that moves switching region 60 from a first position to a second position. For example, electricity may be supplied to an electrically operated device that, in turn, applies mechanical pressure to switching region 60. Electricity may be supplied by an automated or a manual system. Alternatively, as illustrated in FIGS. 2a and 2b, a reservoir 90 may be constructed in microfluidic system 10 adjacent to switching region 60 and fluid may be pumped by an automated or manual system into reservoir 90, causing it to expand and apply pressure to switching region 60. In the preferred embodiment illustrated in FIGS. 2a and 2b, a reservoir 90 has been constructed on both sides of switching region 60. FIG. 2a illustrates switching region 60 of this embodiment in the first position and FIG. 2b illustrates switching region 60 in the second position.

Switching region 60 may be constructed of any material (s) that are compatible with fluid to be used with microfluidic system 10 and allow switching region 60 to perform its function. For example, switching region 60 may be constructed of the elastomeric polymers and using the same techniques described previously for use with fluid paths 20, 30.

Embodiments where switch 50 effects the selective exchange of fluid between fluid paths 20, 30 based on the location of fluid in fluid paths 20, 30 will now be described. These embodiments are based on the fact that, at certain flow conditions and fluid path geometries, fluid on one side of a fluid path is exchanged, while fluid on the other side of the fluid path is not. For example, fluid flowing on the side of first fluid path 20 closest to inlet 32 of second fluid path 30 is less likely to be exchanged with second fluid path 30 than fluid on the opposite side. Accordingly, if the side of first fluid path 20 that fluid is flowing in can be controlled, whether or not it is exchanged with second fluid path 30 can be controlled. This means that by switching the side of first fluid path 20 the fluid is flowing in, the fluid can be switched from first fluid path 20 to second fluid path 30.

In embodiments where switch 50 effects the exchange of fluid between fluid paths 20, 30 by changing the position of fluid in fluid paths 20, 30, switch 50 may be constructed in any manner that allows it to change the position of fluid in fluid paths 20, 30. For example, a carrier fluid may be introduced into first fluid path 20 in addition to a process fluid and the manner in which the carrier fluid is introduced may be used to control the position of the process fluid. As used herein, "process fluid" refers to any fluid whose flow within microfluidic system 10 is sought to be controlled and "carrier fluid" refers to any fluid introduced into microfluidic system 10 for the purpose of controlling the flow of the process fluid.

One embodiment where switch 50 uses a carrier fluid to control the exchange of fluid between fluid paths 20, 30 is illustrated in FIG. 3. In FIG. 3, fluid paths 20, 30 are arranged tangentially, one above the other as illustrated in the embodiment of FIG. 1. However, in this embodiment, additional inlets may be used to facilitate the introduction of carrier fluid into first flow path 20 at various points. For example, as illustrated in FIG. 3, in addition to first inlet 22, first fluid path 20 may also include second inlet 24 and third inlet 26. Additional inlets may be placed relative to first inlet 22 such that introducing carrier fluid through the different inlets changes the location of process fluid within first fluid path 20. For example, in the embodiment illustrated in FIG. 3, second inlet 24 and third inlet 26 are located on opposite sides of first inlet 22. Accordingly, carrier fluid may be introduced on either side of the process fluid through either second inlet 24 or third inlet 26, forcing the process fluid to one side or the other. For example, if carrier fluid is introduced through second inlet 24 into the upper side of first fluid path 20, process fluid entering first fluid path 20 through first inlet 22 may be forced into the lower side of first fluid path 20. To switch fluid from the lower side to the upper side of first fluid path 20, carrier fluid may be introduced into third inlet 26, instead of second inlet 24.

Where switch 50 includes multiple inlets, fluid may be introduced into first fluid path 20 in any manner that provides desired flow of process fluid. For example, fluid may be supplied from a first fluid source 70 to first inlet 22, a second fluid source 72 into second inlet 24 and a third fluid source 72 to third inlet 26. As second and third fluid sources 72 will both typically supply carrier fluid, it is preferred to combine third fluid source 72 with second fluid source 72. Fluid may be supplied from fluid sources 70, 72 in any manner that will deliver it to a desired inlet 22, 24, 26 at a desired rate. For example, fluid may be supplied from fluid sources 70, 72 using a metering system 80. A typical metering system 80 may include a pump for each inlet 22, 24, 26, or a pump for process fluid and a pump for carrier fluid, the latter selectively supplying both second inlet 24 and third inlet 26. Metering system 80 may be controlled in any manner that allows switch 50 to actuate sufficiently quickly and repeatably for a given application. For example, metering system 80 may be automatically or manually controlled to cease supply of carrier fluid to second inlet 24 and begin supply of carrier fluid to third inlet 26 and vice versa, while continuing to supply process fluid to first inlet 22.

EXAMPLES

All experiments were conducted with pressure-driven flow generated with a syringe pump (Orion). Disposable syringes (1 ml) with 27 G needles were connected to the microfluidic system with polyethylene tubing (I.D.=0.38 mm, O.D.=1.09 mm). Volumetric flow rates were controlled by the settings of the syringe pump; these settings were adjusted for flow paths of different aspect ratios to produce flows of identical Re. The flow patterns were visualized using filtered aqueous solutions of commercial inks (Watermark).

Example 1

Experiments were performed to determine the effects of aspect ratio and Reynolds number on the exchange of fluid between tangential fluid paths. The flow patterns were quantified by labeling the fluid entering one of the two fluid paths with a red absorption dye ferroin (1,10-phenanthroline iron(II) sulfate complex). After the system had reached a steady state (1–5 minutes), samples (200–300 $\mu$L) of the solutions exiting from the fluid paths were collected and their optical densities were measured with a diode array UV-VIS spectrometer (Hewlett Packard) at the absorption maximum of ferroin (510 nm).

Figure 4:
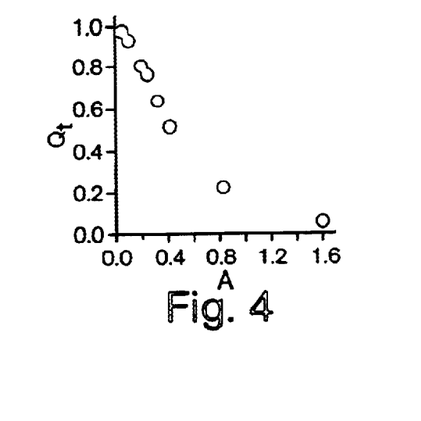
FIG. 4 is a plot of turning fraction ($Q_T$) versus Aspect ratio (A)
Figure 5:
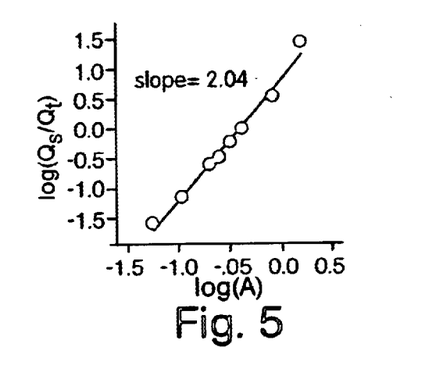
FIG. 5 is a plot of the log of the ratio of non-turning fraction to turning fraction ($Q_S/Q_T$) versus the log of aspect ratio (A)

To quantify the flow through the fluid paths 20, 30 normalized quantities $Q_S$ (volumetric flow rate of the fluid continuing straight through the crossing) and $Q_T$ (volumetric flow rate of the fluid turning at the crossing) were calculated, where the total flow rate through both fluid paths 20, 30 was normalized to the value of 1, so that $Q_S+Q_T=1$. To quantify the fluid exchange between the fluid paths the flows in them were labeled. In one channel, an aqueous solution of ferroin with known optical density was used; in the other, water was used. Since the diffusion of ferroin between the flow paths is negligible in the time scales of interest, the $Q_S/Q_T$ equals the ratio of the optical density of the fluid collected from the fluid path into which the solution of ferroin was introduced to the optical density of the fluid collected from the other fluid path. As illustrated in FIG. 4, at Re=2.5, for fluid paths with a high aspect ratio (A>1.4) $Q_S$>0.9, $Q_T$<0.1 was measured; for fluid paths with low aspect ratio (A<0.1) $Q_S$<0.1, $Q_T$>0.9 was measured. FIG. 5 is a plot of $\log(Q_S/Q_T)$ versus $\log(A)$, again at Re=2.5, which is linear with a slope of approximately 2. Accordingly, the relationship between the aspect ratio and exchange of fluid between fluid paths has been determined and a first and second aspect ratio corresponding to a first and second position of a switching region may be selected accordingly. The dimensions of the fluid paths used for the experiments illustrated in FIGS. 4–5 were 100 $\mu$m×25 $\mu$m (A=0.25), 100 $\mu$m×33 $\mu$m (A=0.33), 100 $\mu$m×42 $\mu$m (A=0.42), 100 $\mu$m×83 $\mu$m (A=0.83), 100 $\mu$m×160 $\mu$m (A=1.6), 400 $\mu$m×23 $\mu$m (A=0.058), 400 $\mu$m×44 $\mu$m (A=0.11) and 400 $\mu$m×84 $\mu$m (A=0.21).

Figure 6:
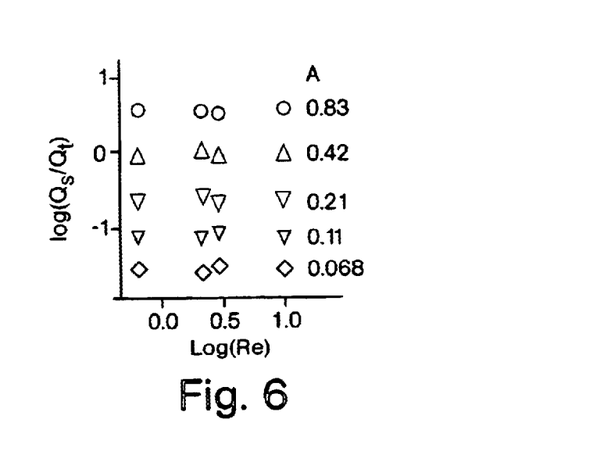
FIG. 6 is a plot of the log of the ratio of non-turning fraction to turning fraction ($Q_S/Q_T$) versus the log of Reynolds Number (Re)

The relationship between ratio of fluid passing to turning ($Q_S/Q_T$) and Reynolds number for a variety of aspect ratios is illustrated in FIG. 6. FIG. 6 demonstrates a very weak dependence on Re at very low Re and, accordingly, that Re may be used as the basis for a switch, but that this is not as effective as using the aspect ratio at such a low Re. The dimensions of the fluid paths used for the experiments illustrated in FIG. 6 were 100 $\mu$m×42 $\mu$m (A=0.42), 100 $\mu$m×83 $\mu$m (A=0.83), 400 $\mu$m×23 $\mu$m (A=0.058), 400 $\mu$m×44 $\mu$m (A=0.11) and 400 $\mu$m×84 $\mu$m (A=0.21).

Figure 11A:
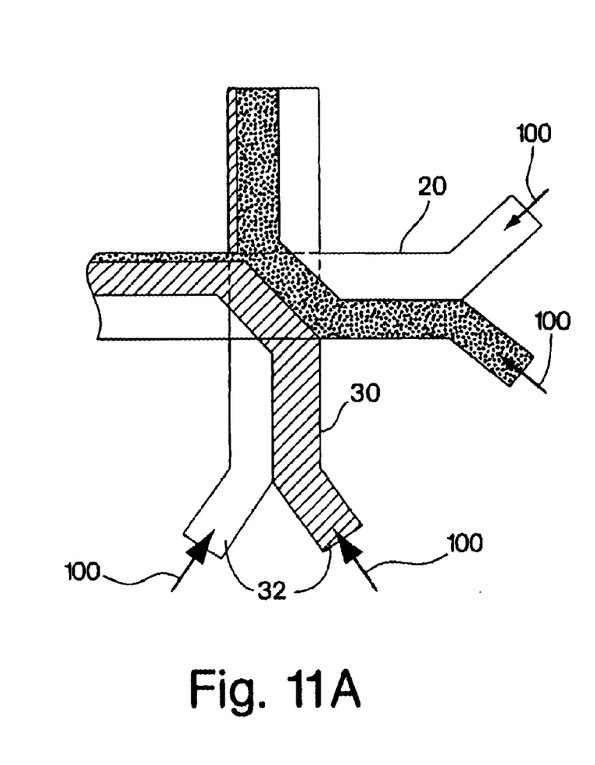
FIG. 11a is a top, plan view of a microfluidic system according to another aspect of the present invention.
Figure 11B:
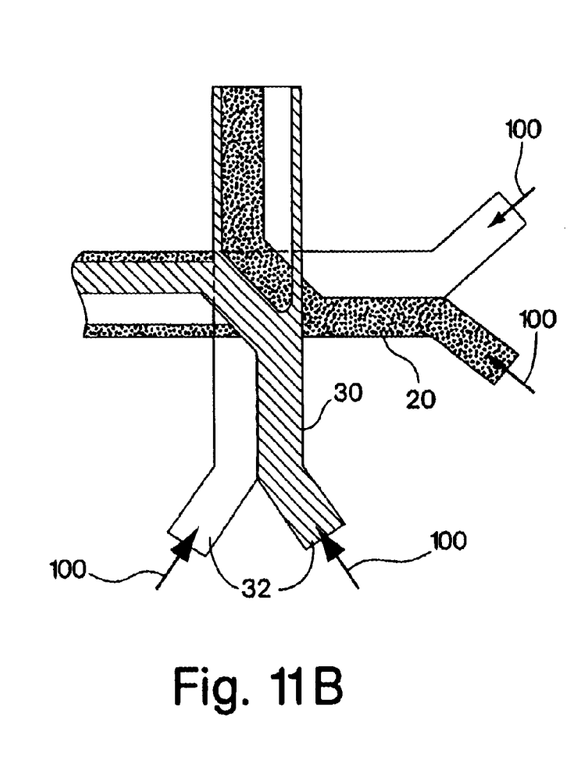
FIG. 11b is a top, plan view of the microfluidic system of FIG. 11a under alternate flow conditions.

In order to determine the switching behavior of fluids at higher Re, experiments similar to those described above were conducted. Colored and uncolored fluid was introduced into both of two tangentially intersecting 400 $\mu$m×40 $\mu$m (A=0.1) fluid paths. The switching behavior was observed first at Re=3 and then at Re=30. The results are illustrated in FIGS. 11*a* and 11*b*, respectively. As the figures illustrate, higher values of Re lead to larger amounts of fluid passing straight through the junction (that is, at sufficiently high Re, ($Q_S/Q_T$) increased as the value of Re increased). Accordingly, it is possible to use Re as the basis of a switch.

Example 2

Experiments were performed to determine whether the position of a fluid within a fluid path could be successfully manipulated to create a switch. Each of the flow paths used for this experiment had three inlets, two of which were used at any one time. The flow paths measured 100 $\mu$m×40 $\mu$m. Process fluids (aqueous solutions dyed red or green) were injected through the middle inlets of each fluid path. Carrier fluid (water) was injected through either the outer or the inner inlets of the fluid paths in order to focus the width of the process fluid streams to approximately $\frac{1}{6}^{th}$ of the width of the channel, and to position these streams within the fluid path. The Re of the fluid in the fluid paths was 10. When carrier fluid was injected through the outer inlets, the process fluid occupied the inner part of each fluid path and continued straight through the crossing region. When carrier fluid was injected through the inner inlets, the process fluid was forced to occupy the outer part of the channel and turned. This demonstrates that a working switch can be constructed by manipulating the position of a fluid within a fluid path.

Example 3

To determine whether a working switch could be constructed using the reservoir system described previously and illustrated in FIG. 2, experiments on such a system were conducted. PDMS tubes (Silastic brand, inner diameter 0.38 mm, outer diameter 1.09 mm) were molded above and below the crossing of fluid paths having a first aspect ratio of 1.2 (w×h=200 $\mu$m×240 $\mu$m). Each fluid path had three inlets, with a colored fluid being introduced into the middle inlet and carrier fluid being introduced into the outer inlets to keep the colored fluid away from the edges of the fluid path. At the crossing, colored fluid continued straight through these high aspect ratio channels. The direction of flow of the colored fluid was reversibly switched by pressurizing the PDMS tubing with air (2 atm)—the expanded PDMS tubing squeezed the channels and decreased their aspect ratio to a second aspect ratio, forcing the flow to turn. This demonstrates that a reservoir system can be used to actuate a switch of the present invention.

It will be understood that each of the elements described herein, or two or more together, may be modified or may also find utility in other applications differing from those described above. While particular embodiments of the invention have been illustrated and described. The present invention is not intended to be limited to the details shown, since various modifications and substitutions may be made without departing in any way from the spirit of the present invention as defined by the following claims.

What is claimed is:

1. A method of controlling fluid flow in a fluidic system, comprising:
   providing a fluidic system, including a first fluid path having a first inlet and a second fluid path in fluid contact with the first fluid path at a fluid contact point;
   flowing a fluid through the first fluid path; and
   changing an aspect ratio of the first fluid path at the fluid contact point to switch at least a portion of the fluid from the first fluid path to the second fluid path at the fluid contact point.

2. A method of controlling fluid flow in a fluidic system comprising:
   providing a fluidic system, including a first fluid path having a first inlet, a second inlet and a third inlet, and a second fluid path in fluid contact with the first fluid path at a fluid contact point;
   supplying a process fluid to the first inlet of the first fluid path;
   supplying a carrier fluid to the second inlet of the first fluid path such that the carrier fluid forces the process fluid into a first portion of the first fluid path, inhibiting switching of the process fluid to the second fluid path at the fluid contact point;
   ceasing supplying the carrier fluid to the second fluid path; and
   supplying the carrier fluid to the third inlet of the first fluid path such that the carrier fluid forces the process fluid into a second portion of the first fluid path, facilitating switching of the process fluid to the second fluid path at the fluid contact point.

3. A method comprising:
   allowing a first fluid to flow along a first fluid path;
   allowing a second fluid to flow along a second fluid path tangentially intersecting the first fluid path, the first and second fluid paths essentially free of the second and first fluids, respectively; and
   manipulating a valve associated with either fluid path, diverting at least a portion of the first fluid into the second path.

4. A fluidic system, comprising:
   a first fluid path having a first inlet;
   a second fluid path in fluid contact with the first fluid path at a fluid contact point;
   a switch for selectively controlling whether, at the fluid contact point, a portion of fluid flowing in one of the first or second fluid paths continues to flow in the same fluid path or flows into the other of the first or second fluid paths; and
   a fluid flowing in at least one of the first fluid path and the second fluid path under laminar flow conditions.

5. The fluidic system of claim 4, wherein the fluid is characterized by having a Reynolds number of less than or equal to about 10.

6. The fluidic system of claim 4, wherein the switch comprises:
   a switching region of the first fluid path proximate to the fluid contact point, the switching region including a first position corresponding to a first aspect ratio of the first fluid path and a second position corresponding to a second aspect ratio of the first fluid path.

7. The fluidic system of claim 4, wherein the switch comprises:
   a second inlet and a third inlet to the first fluid path located on either side of the first inlet;
   a first fluid source connected to the first inlet;
   a second fluid source distinct from the first fluid source connected to the second inlet;
   a third fluid source distinct from the first fluid source connected to the third inlet; and
   a metering system for selectively supplying fluid to the first fluid path from the first fluid source and one of the second fluid source and the third fluid source.

8. A microfluidic system, comprising:
   a first fluid path having a first inlet;
   a second fluid path in fluid contact with the first fluid path at a fluid contact point; and
   a switch for selectively controlling whether, at the fluid contact point, a portion of fluid flowing in one of the first or second fluid paths continues to flow in the same fluid path or flows into the other of the first or second fluid paths;
   wherein at least one of the first fluid path and the second fluid path has a cross-sectional dimension of less than about 500 $\mu$m.

9. The microfluidic system of claim 8, wherein the switch comprises:
   a switching region of the first fluid path proximate to the fluid contact point, the switching region including a first position corresponding to a first aspect ratio of the first fluid path and a second position corresponding to a second aspect ratio of the first fluid path.

10. The microfluidic system of claim 9, wherein the first aspect ratio is greater than the second aspect ratio.

11. The microfluidic system of claim 9, wherein the first aspect ratio is selected to inhibit transfer of fluid from the first fluid path to the second fluid path.

12. The microfluidic system of claim 9, wherein the second aspect ratio is selected to promote transfer of fluid from the first fluid path to the second fluid path.

13. The microfluidic system of claim 9, wherein the first aspect ratio of the first fluid path is greater than about 1.

14. The microfluidic system of claim 9, wherein the second aspect ratio of the first fluid path is less than about 1.

15. The microfluidic system of claim 9, wherein the switching region of the first fluid path is constructed of a flexible material.

16. The microfluidic system of claim 15, wherein the switching region of the first fluid path is constructed of an elastomer.

17. The microfluidic system of claim 8, wherein the switch comprises:
   a second inlet and a third inlet to the first fluid path located on either side of the first inlet;
   a first fluid source connected to the first inlet;

a second fluid source distinct from the first fluid source connected to the second inlet;

a third fluid source distinct from the first fluid source connected to the third inlet; and a metering system for selectively supplying fluid to the first fluid path from the first fluid source and one of the second fluid source and the third fluid source.

18. The microfluidic system of claim 17, wherein the first fluid source is a source of a process fluid and the second fluid source and third fluid source are sources of a carrier fluid.

19. The microfluidic system of claim 8, wherein the first fluid path is substantially rectangular in cross-section.

20. The microfluidic system of claim 8, wherein the second fluid path crosses the first fluid path at the fluid contact point, defining a crossing angle.

21. The microfluidic system of claim 20, wherein the first fluid path and second fluid path partially overlap at the fluid contact point.

22. The microfluidic system of claim 21, wherein the first fluid flow path and the second flow path are tangential to one another at the fluid contact point.

23. The microfluidic system of claim 20, wherein the crossing angle is between about 5 and about 175 degrees.

24. The microfluidic system of claim 23, wherein the crossing angle is between about 30 and about 150 degrees.

25. The microfluidic system of claim 24, wherein the crossing angle is between about 45 and about 135 degrees.

26. The microfluidic system of claim 20, wherein the crossing angle is about 90 degrees.

27. The microfluidic system of claim 8, wherein at least one of the first fluid path and the second fluid path has a cross-sectional dimension of less than about 300 $\mu$m.

28. The microfluidic system of claim 27, wherein at least one of the first fluid path and the second fluid path has a cross-sectional dimension of less than about 100 $\mu$m.

29. The microfluidic system of claim 28, wherein at least one of the first fluid path and the second fluid path has a cross-sectional dimension of less than about 50 $\mu$m.

30. The microfluidic system of claim 8, wherein both the first fluid path and the second fluid path have a cross-sectional dimension of less than about 500 $\mu$m.

31. The microfluidic system of claim 8, wherein both the first fluid path and the second fluid path include respective portions upstream and downstream of the fluid contact point.

* * * * *